(12) United States Patent
Lee et al.

(10) Patent No.: US 7,753,348 B2
(45) Date of Patent: Jul. 13, 2010

(54) GAS-LIQUID CONTACT APPARATUS

(75) Inventors: Adam T Lee, Dallas, TX (US); Kuang-Yeu Wu, Plano, TX (US); Larry W Burton, Waxahachie, TX (US)

(73) Assignee: AMT International, Inc., Richardson, TX (US)

( * ) Notice: Subject to any disclaimer, the term of this patent is extended or adjusted under 35 U.S.C. 154(b) by 671 days.

(21) Appl. No.: 11/700,217

(22) Filed: Jan. 30, 2007

(65) Prior Publication Data

US 2008/0179766 A1 Jul. 31, 2008

(51) Int. Cl.
*B01F 3/04* (2006.01)

(52) U.S. Cl. .................................. 261/114.1; 261/114.5

(58) Field of Classification Search .............. 261/114.1, 261/114.2, 114.3, 114.4, 114.5
See application file for complete search history.

(56) References Cited

U.S. PATENT DOCUMENTS

| | | | |
|---|---|---|---|
| 3,218,048 A | 11/1965 | Smith, Jr. et al. |
| 3,450,393 A | 6/1969 | Munters |
| 3,647,192 A | 3/1972 | DeGroot et al. |
| 3,729,179 A | 4/1973 | Keller |
| 3,747,905 A | 7/1973 | Nutter |
| 3,887,665 A | 6/1975 | Mix et al. |
| 3,959,419 A | 5/1976 | Kitterman |
| 4,105,723 A | 8/1978 | Mix |
| 4,132,761 A | 1/1979 | Mix |
| 4,274,923 A | 6/1981 | Mahar |
| 4,300,918 A | 11/1981 | Cary |
| 4,528,068 A | 7/1985 | Fiocco et al. |
| 4,597,916 A | 7/1986 | Chen |
| 4,603,022 A | 7/1986 | Yoneda et al. |
| 4,604,247 A | 8/1986 | Chen et al. |
| 4,818,346 A | 4/1989 | Bentham et al. |
| 4,842,778 A | 6/1989 | Chen et al. |

(Continued)

FOREIGN PATENT DOCUMENTS

EP 0 250 020 A2 12/1987

(Continued)

OTHER PUBLICATIONS

Lockettt, M. J., "Distillation tray fundamentals", Cambridge University Press, Cambridge, England, c. 1986, pp. 178-186.

(Continued)

*Primary Examiner*—Scott Bushey
(74) *Attorney, Agent, or Firm*—Davis & Bujold, P.L.L.C.

(57) ABSTRACT

A tray assembly is provided for improved gas/liquid contact when used in a large chemical process tower, resulting in better performance. Each tray assembly has two levels of tray decks and associated downcomers. Tray decks provide gas/liquid contact for mass transfer and the downcomers are required to clarify the liquid before entering the tray below. A novel downcomer configuration is provided for use in multi-pass trays. The shape of downcomer bottom chord is designed to allow for liquid to travel across any part of each tray deck at a similar distance between the inlet and the outlet weir. As a result, liquid on the tray deck travels in plug flow pattern. Benefits include a higher Murphree tray efficiency due to minimum liquid back-mixing, as well as minimum local entrainment due to uniform froth height.

9 Claims, 8 Drawing Sheets

U.S. PATENT DOCUMENTS

| | | |
|---|---|---|
| 4,950,430 A | 8/1990 | Chen et al. |
| 4,954,294 A | 9/1990 | Bannon |
| 5,139,544 A | 8/1992 | Lucero et al. |
| 5,192,466 A | 3/1993 | Binkley |
| 5,213,719 A | 5/1993 | Chuang |
| 5,244,604 A | 9/1993 | Miller et al. |
| 5,262,094 A | 11/1993 | Chuang |
| 5,269,976 A | 12/1993 | Biddulph et al. |
| 5,277,847 A | 1/1994 | Gentry et al. |
| 5,366,666 A | 11/1994 | Chuang et al. |
| 5,389,343 A | 2/1995 | Gentry |
| 5,439,510 A | 8/1995 | Lerner |
| 5,453,222 A | 9/1995 | Lee et al. |
| 5,454,989 A | 10/1995 | Nutter |
| 5,554,329 A | 9/1996 | Monkelbaan et al. |
| 5,707,563 A | 1/1998 | Monkelbaan et al. |
| 5,762,668 A | 6/1998 | Lee et al. |
| 5,837,105 A | 11/1998 | Stober et al. |
| 5,972,171 A | 10/1999 | Ross et al. |
| 5,975,504 A | 11/1999 | Nutter et al. |
| 6,053,484 A | 4/2000 | Fan et al. |
| 6,059,934 A | 5/2000 | Stober et al. |
| 6,076,813 A | 6/2000 | Yeoman et al. |
| 6,287,367 B1 | 9/2001 | Buchanan et al. |
| 6,371,455 B1 | 4/2002 | Lee et al. |
| 6,588,735 B2 | 7/2003 | Bosmans et al. |
| 6,817,596 B2 | 11/2004 | Fischer |
| 6,994,331 B2 * | 2/2006 | Coney .................... 261/114.1 |
| 2001/0015504 A1 * | 8/2001 | Bosmans et al. ......... 261/114.1 |
| 2004/0080059 A1 * | 4/2004 | Weiland et al. ............ 261/79.2 |

FOREIGN PATENT DOCUMENTS

| | | |
|---|---|---|
| GB | 1065554 | 4/1967 |

OTHER PUBLICATIONS

Wankat, Phillip C., "Equilibrium staged separations", Elsevier, New York, USA, c. 1988, pp. 372-379.

Kister, Henry Z., "Distillation Design", McGraw-Hill, Inc., 1992, pp. 382-389.

Wijn, E. F., "The effect of downcomer layout pattern on tray efficiency", published in *The Chemical Engineering Journal*, Jan. 30, 1996, vol. 63, pp. 167-180.

Stichlmair, Johann G. et al., "Distillation: Principles and Practices", Wiley-VCH, New York, USA, c. 1998, pp. 386-389.

UOP, Brochure entitled "Trays for Distillation, Absorption, Stripping and Extraction", 2008.

King, C. Judson, "Separation Process", McGraw-Hill Book Company, 1980, 2d edition, pp. 614, 619.

Chen, Gilbert, "Packed Column Internals", *Chemical Engineering*, Mar. 5, 1984, pp. 40-51.

Wankat, Phillip C., "4.2 Distillation Equipment" of *Equilibrium Staged Separations*, PTR Prentice Hall, c1988, pp. 94-96.

Kister, Henry C., "Distillation Design", McGraw-Hill Inc., 1992, p. 383.

* cited by examiner

GAS-LIQUID CONTACT APPARATUS

FIELD

The present invention relates to trays for use in chemical process towers and, more particularly, to improved tray capacity and efficiency thereof through more uniform liquid distribution on a tray deck.

BACKGROUND

Several tray designs are known for gas-liquid contactors used in processes including reactions and separations. In each design, trays are situated within the towers for contact between the components of mixtures within the towers. Several tray designs are known, as described by, for example, Philip C. Wankat in "Equilibrium Staged Separations" published by Elsevier (1988), C. Judson King in "Separation Processes" published by McGraw-Hill Book Company ($2^{nd}$ edition, 1980), and Henry Z. Kister in "Distillation Design" published by McGraw-Hill, Inc. (1992).

In a conventional tray design as illustrated, for example, by Kister in FIG. 7.7 on page of "Distillation Design" flow of liquid across a tray tends to follow the shortest path across the tray deck from the inlet downcomer toward the outlet downcomer. A consequence for chemical process towers having a circular cross-sectional design in which there are stagnant regions develop on the areas of the tray deck near the walls of the tower. The flow pattern is shown by King in FIGS. 12-15 and 12-16 on page 614 of "Separation Processes." FIGS. 12-16 shows that there is non-uniform flow of liquid across a plate and, in extreme cases, recirculation cells are formed. This non-uniform liquid distribution also exists on conventional multi-pass trays where the downcomer bottom chord and outlet weir are always in different lengths.

It is desirable to effect good mixing of all components on the tray deck. When there is highly non-uniform liquid distribution above the tray arising from extensive back-mixing, the Peclet number approaches zero. When there is very little back-mixing i.e. uniform distribution of liquid across the tray, the Peclet number approaches infinity. The variation in Peclet number for diffusion liquid-mixing is illustrated by King in FIGS. 12-19 on page 619 of "Separation Processes." For a given point efficiency, the Murphree efficiency of a tray increases as the Peclet number increases, and so it is desirable to maximize the Peclet number.

The tray deck is perforated to allow gas to rise through the perforations and bubble through the liquid flowing across the tray deck, thereby effecting contact between the liquid and the gas. An outlet weir is situated toward the edge of the tray deck adjacent the outlet downcomer, so as to maintain a depth of liquid and froth across the tray deck. Froth is formed when gas rises as bubbles through the liquid. It is important that the froth height is approximately even at all locations along the length of the outlet weir, as uneven froth height causes high entrainment and thus premature flooding.

What is needed is a tray designed to have higher capacity and efficiency in which the distance traveled by all liquid across the tray deck is essentially similar for all paths along which that liquid flows, so as to achieve:

a high Peclet number due to very little or no back-mixing, and so very uniform distribution of components in the mixture above the tray, no stagnant regions above the tray decks, and a froth height that is even across the length of the outlet downcomer weir.

SUMMARY

The present invention relates to an improved design for trays within a chemical process tower. The trays have curved outlet weirs along curved edges of the tray decks so that the distance traveled by liquid flowing across the tray decks is substantially similar at all locations on those tray decks. As a consequence, there is uniform liquid distribution across the tray decks, very little or no back-mixing, no stagnant regions, and even froth height along the length of the outlet weir. The net result is that there is higher tray capacity and efficiency when compared with prior art trays.

DESCRIPTION OF THE DRAWINGS

For a more complete understanding of the present invention and for further objects and advantages thereof, reference is made to the following description taken in conjunction with the accompanying drawings.

DETAILED DESCRIPTION

Exemplary embodiments of the invention, which are non-limiting, will now be described with reference to FIG. 1 through FIG. 8.

Figure 1:
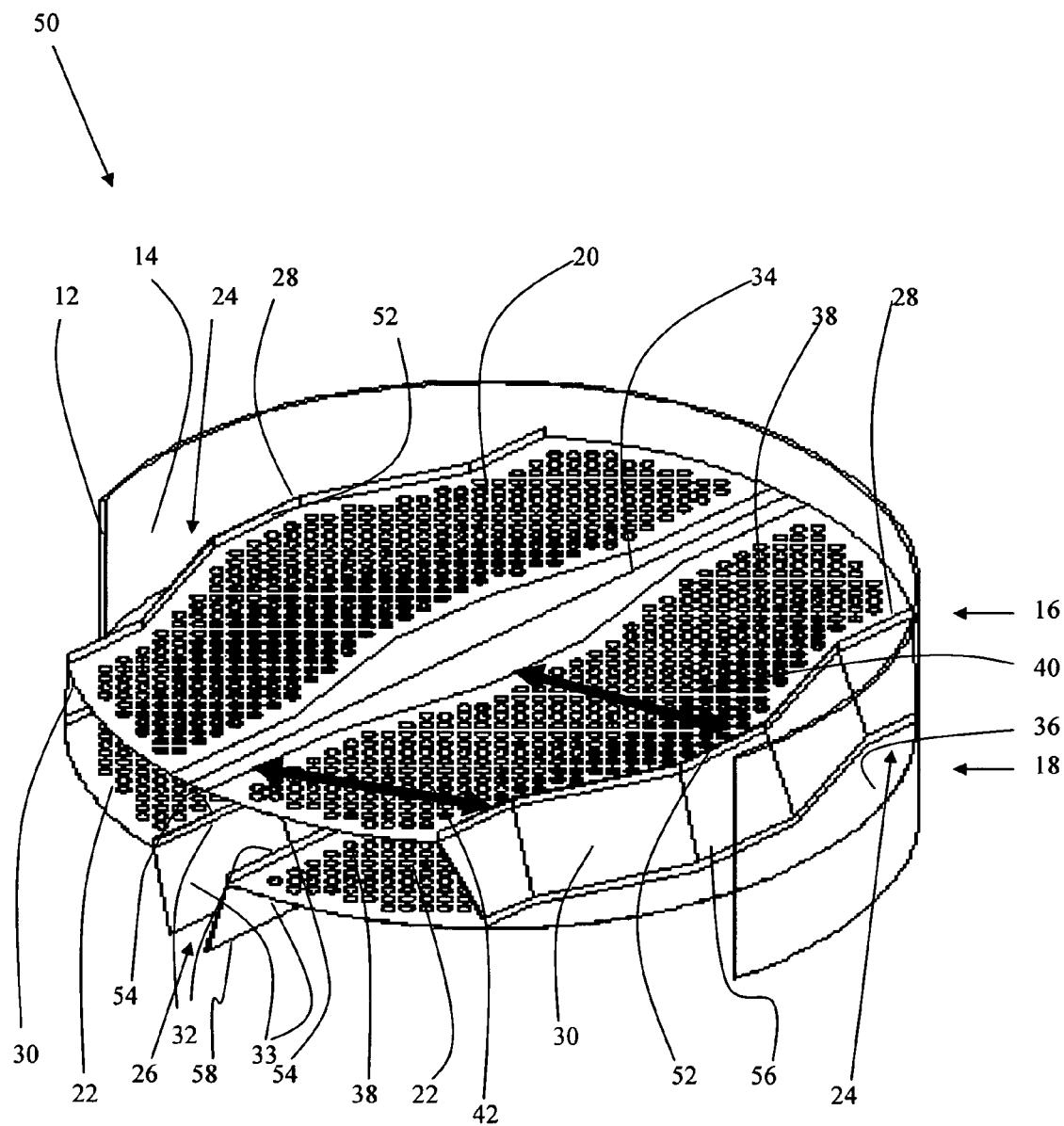
FIG. 1 is a perspective view of a tray assembly comprising a combination of a first tray deck level and a second tray deck level for high efficiency and uniform liquid distribution.
Figure 2:
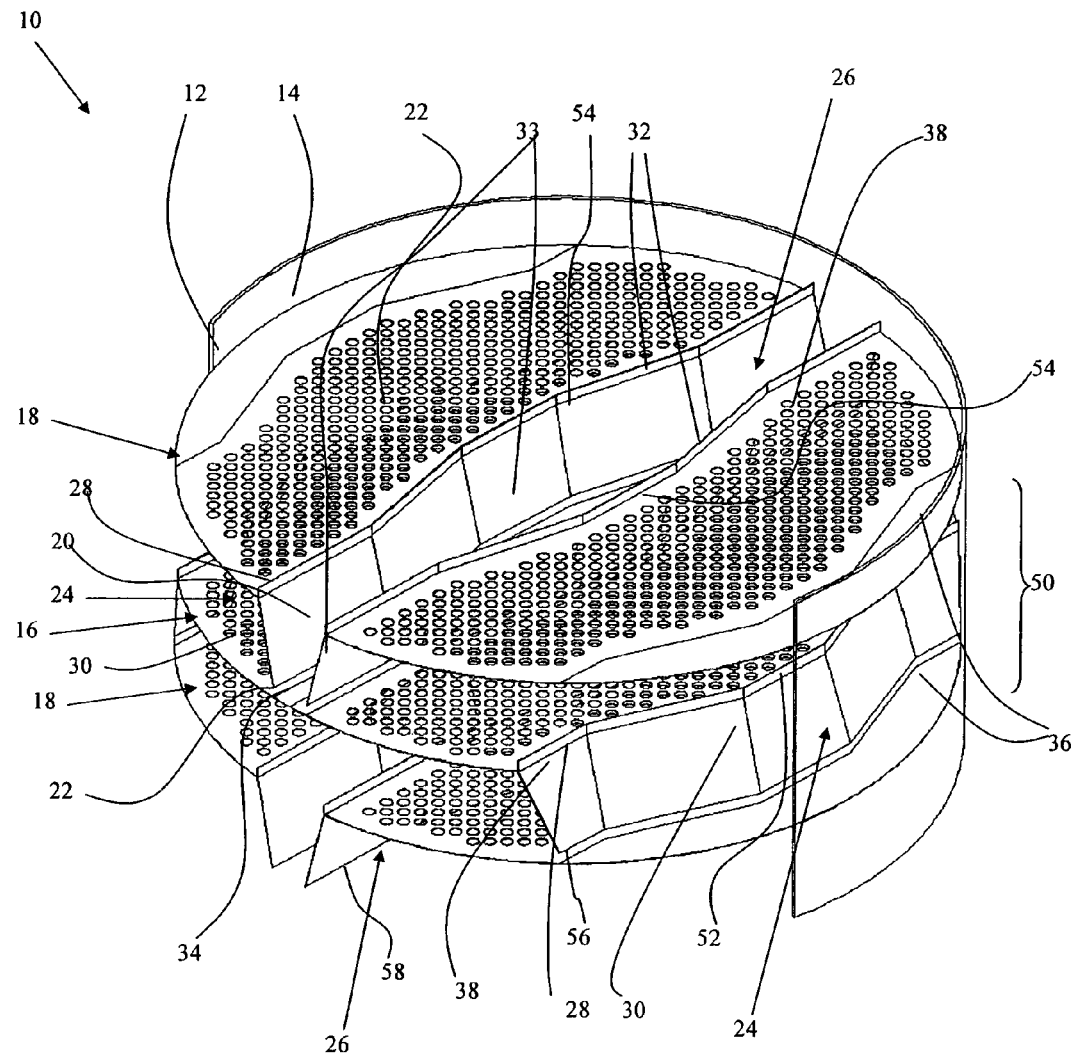
FIG. 2 is a perspective view showing stacking of tray assemblies shown in FIG. 1.

Referring to FIGS. 1 and 2, a tray assembly 50 for gas/liquid contact in a chemical process tower 10, having walls 12 with an inner surface 14 to which tray assemblies 50 can be affixed, comprises a first tray deck level 16 and a second tray deck level 18. Referring to FIGS. 1, 3, 4 and 5, first tray deck level 16 has at least one first tray deck 20 and at least one first downcomer 24 at a first edge 52 of first tray deck 20. Referring to FIGS. 1, 3, 4 and 6, second tray deck level 18 has at least one second tray deck 22 and at least one second downcomer 26 at a second edge 54 of said second tray deck 18.

Figure 7:
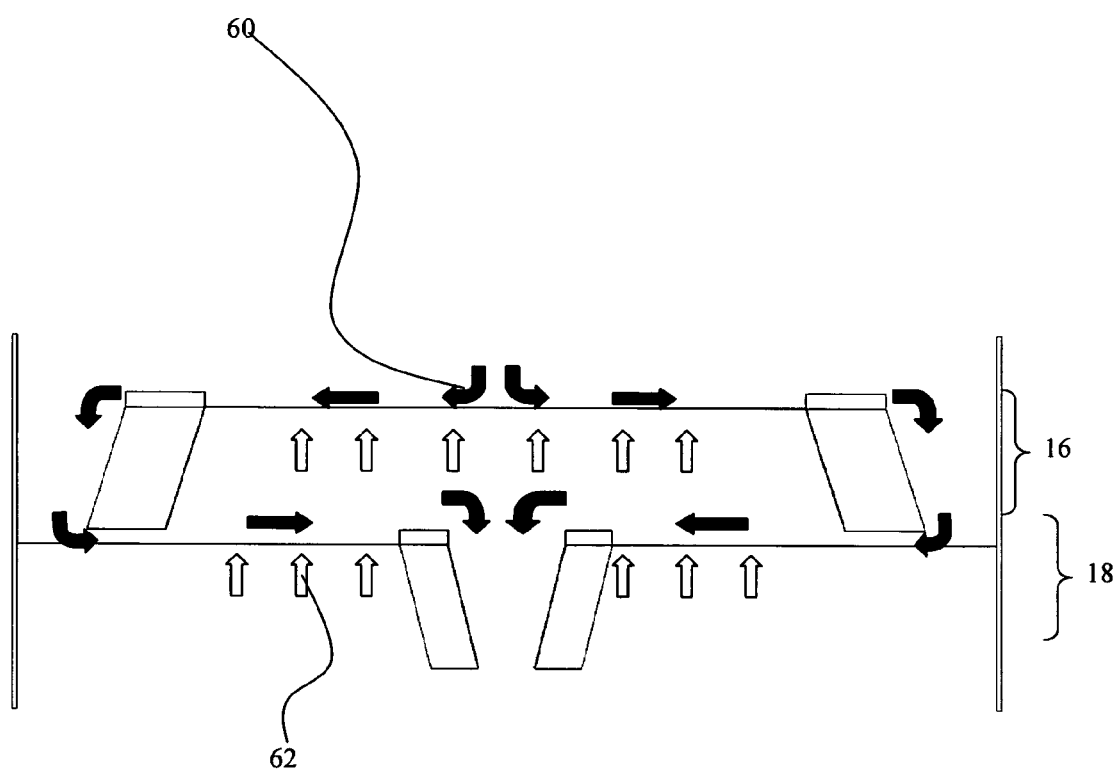
FIG. 7 is a side view of the tray assembly shown in FIG. 3, showing the flow of liquids and gases.

Referring to FIGS. 1 and 2, each of first tray deck 20 and second tray deck 22 is perforated with holes 38. Referring to FIG. 7, the direction of travel of liquid flowing across tray decks 20, 22 and descending through downcomers 24, 26 is shown as solid arrows 60 and the direction of gas flow is shown by open arrows 62. Gas 62 can rise through holes 38 in tray decks 20, 22 from the regions immediately below one of first tray deck 20 and second tray deck 22 and bubble through liquid 60 flowing across the corresponding tray deck 20, 22.

Figure 8A:
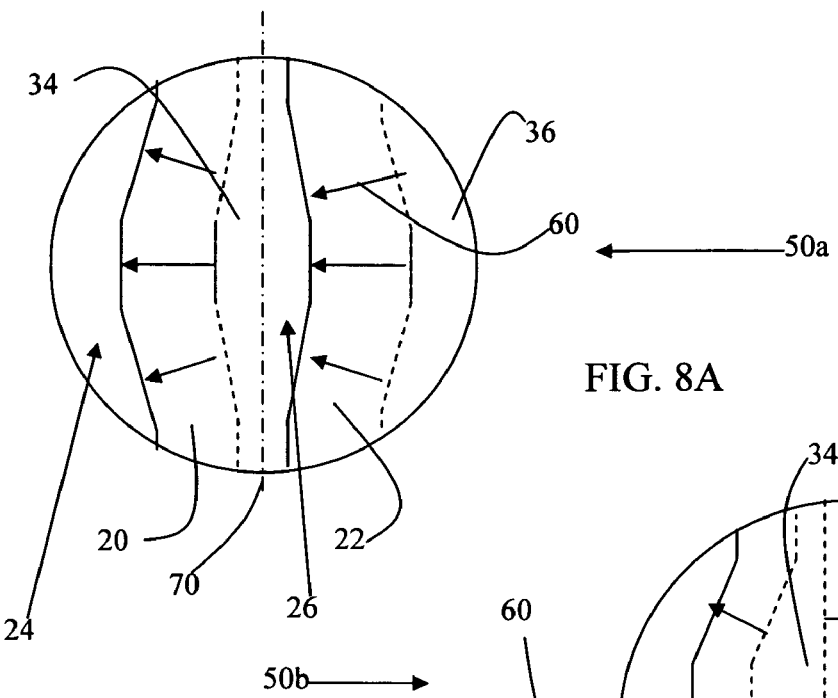
FIG. 8A shows the flow paths of a 2-pass tray, where the left side and right side each show one-half of successive levels of trays.
Figure 8B:
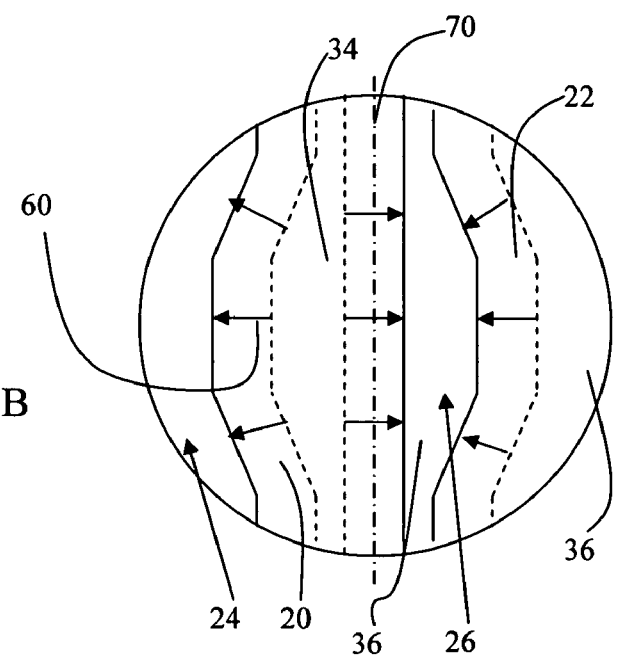
FIG. 8B shows the flow paths of a 3-pass tray, where the left side and right side each show one-half of successive levels of trays.
Figure 8C:
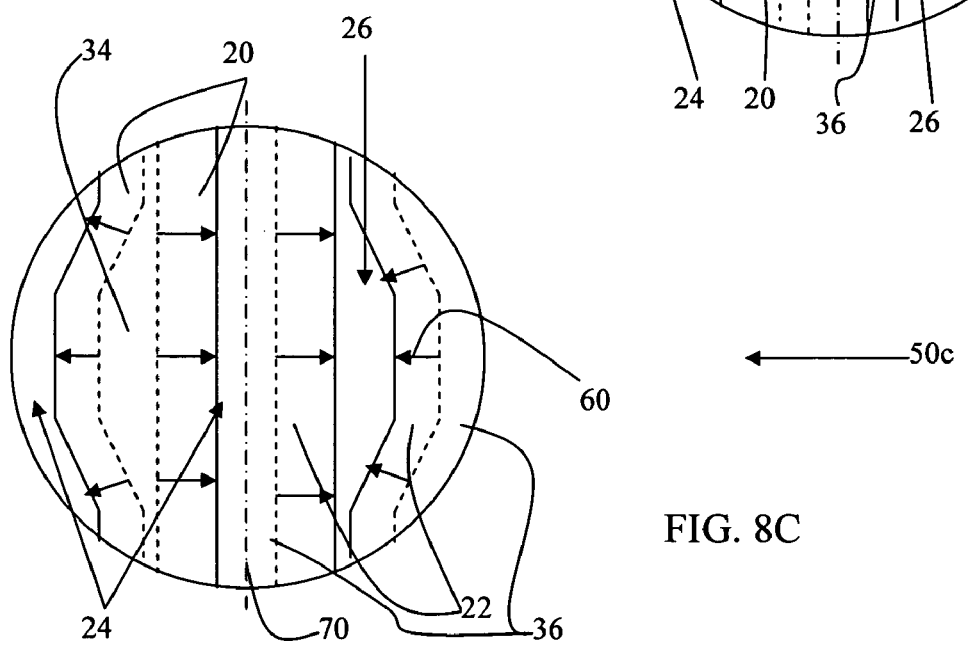
FIG. 8C shows the flow paths of a 4-pass, where the left side and right side each show one-half of successive levels of trays.

To illustrate the structure of tray assembly 50, the following description and references to FIGS. 1 through 7 show first tray deck level 16 having a single tray deck 20 and two first downcomers 24 each of which is situated between first edge 52 and walls 12. Second tray deck level 18 has two divided parts of second tray deck 32 extending from walls 12 to a single central second downcomer 26 extending between second edges 54 of each of divided parts of second tray deck 32. It will be recognized that each of first tray deck 20 of first tray deck level 16 and second tray deck 22 of second tray deck level 18 may be divided into several parts, with a plurality of first downcomers 24 and second downcomers 26 situated therebetween, as illustrated in FIG. 8, without deviating from the principles, intent and targeted benefits of the present invention. FIG. 8 shows three different examples of possible embodiments of tray assembly, showing the relationships between portions of each of the components of successive tray deck levels 16 and 18, the division between the portions being indicated by a dash-dot line 80. In FIG. 8A a first embodiment 50a shows the relationships between first deck 20 and second deck 22 and first downcomer 24 and second downcomer 26 in a two-pass design. In FIG. 8B, a second embodiment 50b shows a three-pass design. In FIG. 8C, a third embodiment 50c shows a four-pass design. Liquid flow paths are indicated by solid arrows 60.

Referring to FIGS. 1, 3, 4 and 5, when first downcomer 24 is adjacent walls 12 of chemical process tower 10, it is bounded by a combination of on one side inner surface 14 of walls 12 and on the other side a first curved downcomer wall 30. When there are a plurality of downcomers 24 at first tray deck level 16, interior downcomers 24 are bounded at their ends by opposed portions of walls 12 and extending between them a combination of two first curved downcomer walls 30. Referring to FIGS. 1, 3, 4 and 6, similarly, second downcomer 26 is bounded by one of a combination of on one side the inner surface 14 of the walls 12 of the chemical process tower 10 and on the other side a second curved downcomer wall 33, or a combination of two second curved downcomer walls 33 extending between opposed portions of walls 12.

First downcomer walls 30 extend downward from first edges 52 of first tray deck 20 toward second tray deck 22 immediately below. There is a gap 44 between a first bottom edge 56 (downcomer bottom chord) of first downcomer walls 30 and second tray deck 22 that extends along all or the majority of the length of first downcomer walls 30. Second downcomer walls 33 extend downward from second edges 54 of second tray deck 22 toward first tray deck 20 immediately below. There is a gap 46 between a second bottom edge 58 (downcomer bottom chord) of second downcomer walls 33 and first tray deck 20 that extends along all or the majority of the length of second downcomer walls 33. Preferably, each of first downcomer walls 30 and second downcomer walls 33 is sloped so the corresponding first downcomer 24 and second downcomer 26 narrows as it approaches corresponding first bottom edge 56 and second bottom edge 58, as illustrated in FIGS. 1 and 3.

Figure 3:
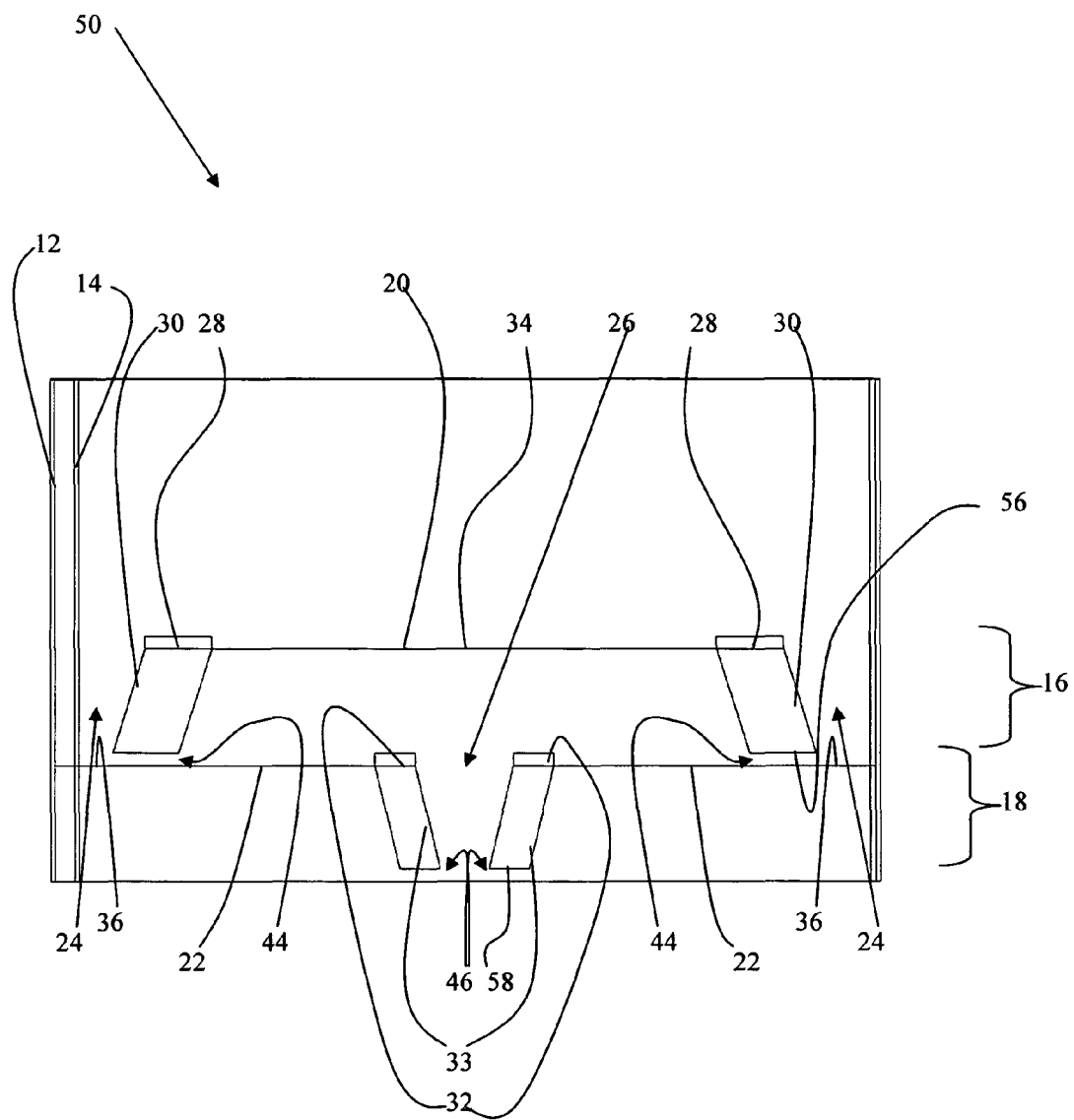
FIG. 3 is a first side view of the tray assembly shown in FIG. 1.
Figure 4:
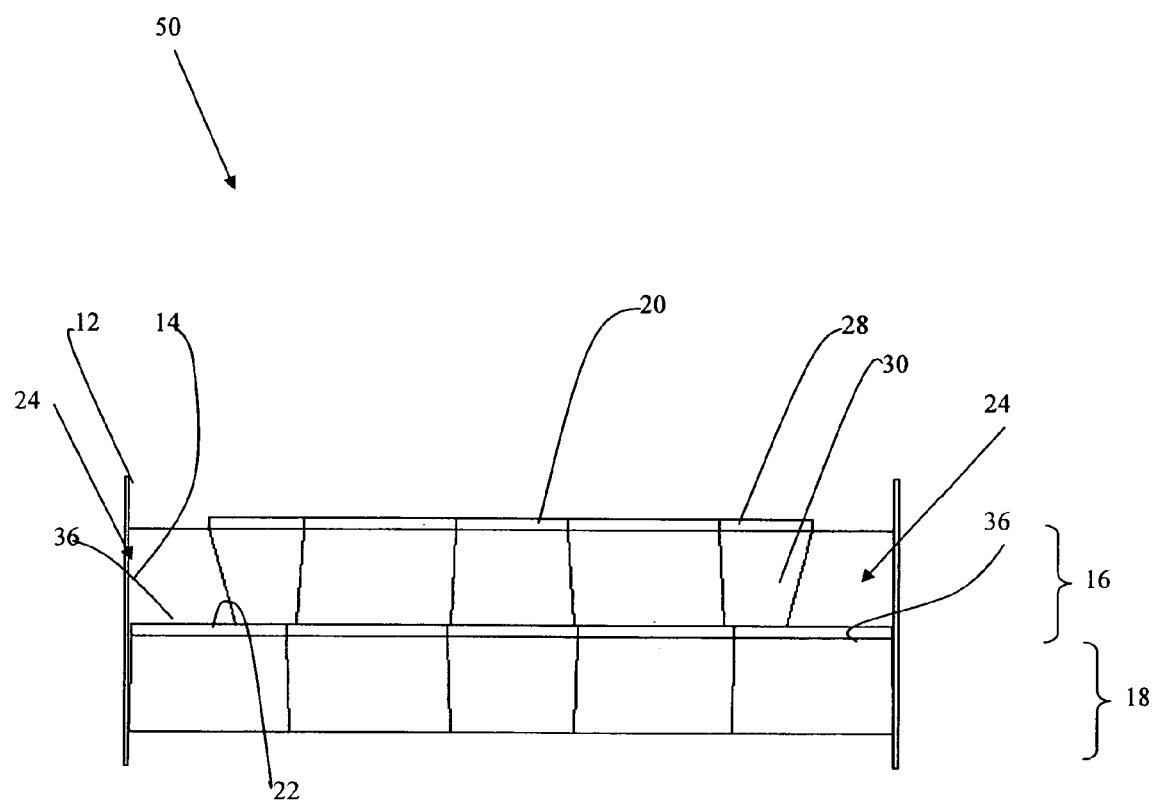
FIG. 4 is a second side view of the tray assembly shown in FIG. 1.
Figure 5:
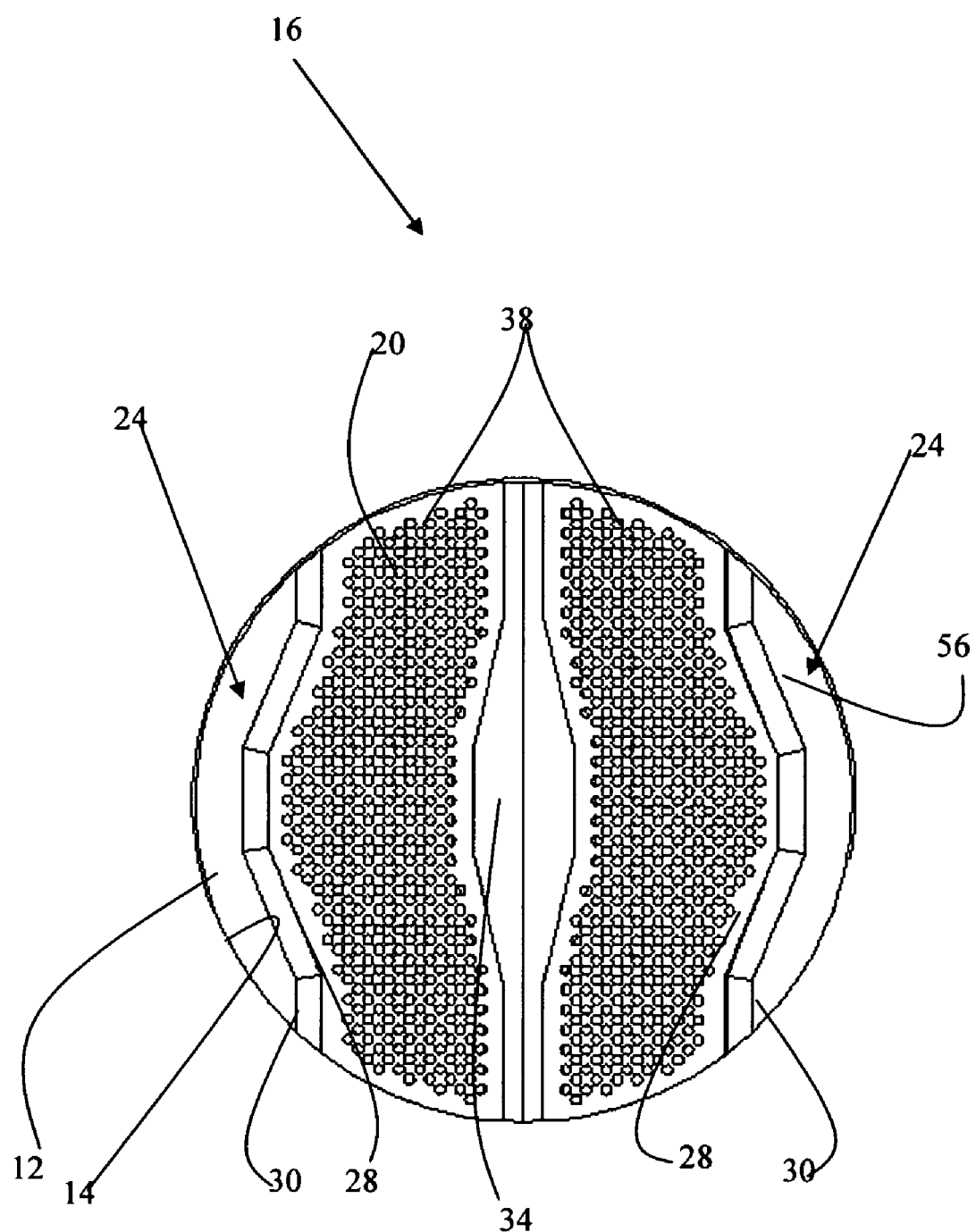
FIG. 5 is a top view of the first tray deck level shown in FIG. 1.
Figure 6:
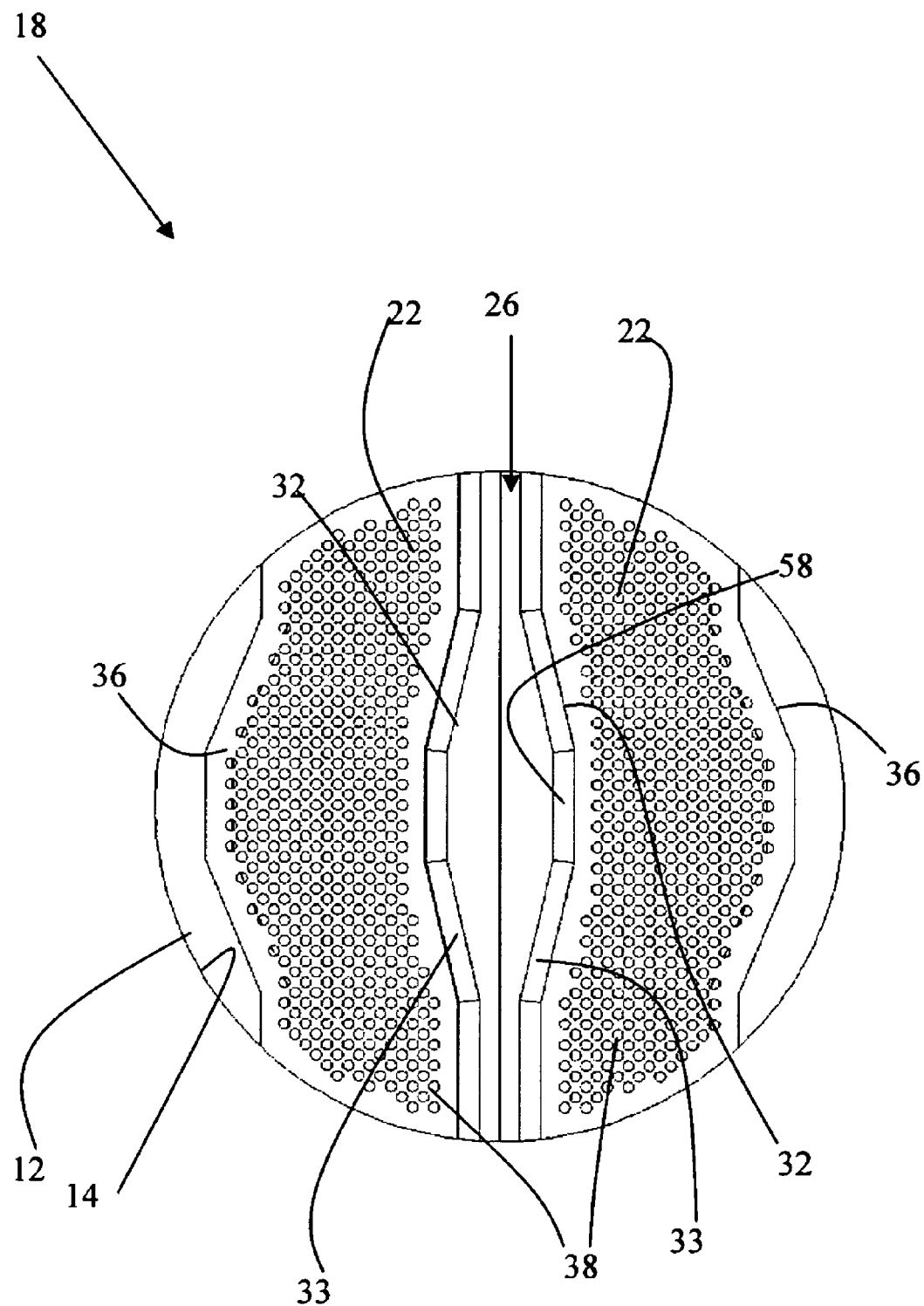
FIG. 6 is a top view of the second tray deck level shown in FIG. 1.

Referring to FIGS. 1, 2 and 3, a first inlet (receiving) area 34 on tray deck 20 is immediately below each one of second downcomers 26. A second inlet (receiving) area 36 on tray deck 22 is immediately below each one of first downcomers 24.

Preferably, a first outlet weir 28 is situated across the breadth of first tray deck 20 and is positioned at or adjacent to first edge 52, and a second outlet weir 32 is situated across the breadth of second tray deck 22 and positioned at or adjacent to second edge 54.

Optionally, a first inlet weir (not illustrated) is situated across the breadth of first tray deck 20 and is positioned adjacent to first inlet area 34. Optionally, a second inlet weir (not illustrated) is situated across the breadth of second tray deck 22 and is positioned adjacent to second inlet area 36.

First edge 52 of first tray deck 20 is curved, and second edge 54 of second tray deck 22 is also curved. First downcomer walls 30 and first outlet weir 28 are curved to match the curve of first edge 52. Second downcomer walls 33 and second outlet weir 32 are curved to match the curve of second tray edge 54. The curvature of each of first edge 52, second edge 54, first downcomer walls 30, second downcomer walls 33, first outlet weir 28 and second outlet weir 32 are in a plane defined mainly by tray deck 20, 22 of the respective tray deck level 16, 18. The shapes of the curvatures are selected from among a smooth arc, a curve achieved by a sequence of short linear adjoining sections at graduated angles relative to each other, and a combination of smooth arcs and short linear sections.

The curvature of the inward side of first inlet area 34 is defined approximately by the curvature of second bottom edge 58 of second downcomer walls 33. The combination of the curvatures of first edge 52 and of the inward side of first inlet area 34 defines the area of first tray deck 20 perforated by holes 38 over which liquid flows from inlet area 34 to first edge 52. Similarly, the curvature of a side of second inlet area 36 is defined approximately by the curvature of first bottom edge 56 of first downcomer walls 30. The combination of the curvatures of second edge 54 and the corresponding side of the second inlet area 36 defines the area of second tray deck 22 perforated by holes 38 over which liquid flows from second inlet area 36 to second edge 54.

Referring to FIG. 1, the curvatures of each of first edge 52 and of the inward side of first inlet area 34 are such that any part of liquid flowing across any portion of first tray deck 20 travels a similar distance to any other part of said liquid, as shown by double arrows 40 and 42. Similarly, any part of liquid flowing across any portion of second tray deck 22 travels a similar distance to any other part of said liquid. The consequence is that there is uniform liquid distribution with minimized back-mixing, and so a high Peclet number, across the entire area of both first tray deck 20 and across the entire area of second tray deck 22. A further beneficial consequence is that there is approximately even froth height at both of first edge 52 of first tray deck 20, and approximately even froth height at second edge 54 of second tray deck 22, thus reducing any propensity to premature flooding resulting from high entrainment.

It will be recognized that there may be an odd number of tray deck levels in any chemical process tower 10, in which case there will be one more of either first tray deck level 16 or second tray deck level 18.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The invention claimed is:

1. A tray assembly for gas/liquid contact in a chemical process tower having walls with an inner surface to which at least one tray assembly can be affixed, in which each tray assembly comprises a first tray deck level and a second tray deck level;

the first tray deck level having at least one first tray deck and at least one first downcomer at a first curved edge of the first tray deck;

the second tray deck level having at least one second tray deck and at least one second downcomer at a second curved edge of the second tray deck;

so that a first receiving inlet area of the first tray deck is immediately below each second downcomer and a second receiving inlet area is immediately below each first downcomer;

the first curved downcomer wall extends downward from a first edge of the first tray deck toward the second tray deck immediately below, there being a first gap between a first bottom edge of the first curved downcomer wall and the second tray deck, that extends substantially along a length of the first curved downcomer wall, and the second downcomer curved wall extends downward from a second edge of the second tray deck toward the first tray deck immediately below, there being a second gap between a second bottom edge of the second curved downcomer wall and the first tray deck, that extends substantially along the length of the second curved downcomer wall;

the first edge of the first tray deck, the first bottom edge of the first curved downcomer wall, the second edge of the second tray deck and the second bottom edge of the second curved downcomer wall are each curved with substantially the same curvature, so that:

any part of liquid flowing across any portion of one of the first tray deck travels a similar distance to any other part of said liquid, and any part of liquid flowing across any portion of one of the second tray deck travels a similar distance to any other part of said liquid, thus providing uniform liquid distribution, minimizing back-mixing, and providing approximately even froth height at the first edge of the first tray deck, and approximately even froth height at the second edge of the second tray deck.

2. A tray assembly according to claim 1, wherein a tray at a position selected from a top of a stack of trays and a bottom of the stack of trays has only one of the first tray deck level and the second tray deck level so that there is one more of one of first tray deck level and second tray deck level contained within the chemical process tower.

3. A tray assembly according to claim 1, wherein the tray decks of each of the first tray deck levels and the second tray deck levels are separated into a plurality of portions between a plurality of downcomers, thereby forming a plurality of flow paths of approximately equal length over which liquid flows.

4. A tray assembly according to claim 1, wherein there is a first outlet weir that is situated upon the first tray deck at a position adjacent to the first edge of the first tray deck.

5. A tray assembly according to claim 1, wherein there is a second outlet weir that is situated upon the second tray deck at a position adjacent to the second edge of the second tray deck.

6. A tray assembly according to claim 1, wherein the curvature of each curved component is:

in a plane defined mainly by the tray deck of the respective tray deck level; and selected from a group consisting of a smooth arc, a curve achieved by a sequence of short linear adjoining sections at graduated angles relative to each other, and a combination of smooth arcs and short linear sections.

7. A tray assembly for gas/liquid contact in a chemical process tower having walls with an inner surface to which at least one tray assembly can be affixed, in which each tray assembly comprises a first tray deck level and a second tray deck level;

the first tray deck level having at least one first tray deck and at least one first downcomer at a first curved edge of the first tray deck;

the first downcomer being bounded by one of:

a combination of, on one side the inner surface of the walls of the chemical process tower, and on the other side a first curved downcomer wall; and a combination of two first curved downcomer walls;

the second tray deck level having at least one second tray deck and at least one second downcomer at a second curved edge of the second tray deck;

the second downcomer being bounded by one of:

a combination of, on one side the inner surface of the walls of the chemical process tower, and on the other side a second curved downcomer wall; and a combination of two second curved downcomer walls;

so that a first receiving inlet area of the first tray deck is immediately below each second downcomer and a second receiving inlet area is immediately below each first downcomer, the first curved downcomer wall extends downward from a first edge of the first tray deck toward the second tray deck immediately below, there being a first gap between a first bottom edge of the first curved downcomer wall and the second tray deck, that extends substantially along a length of the first curved downcomer wall, and the second downcomer curved wall extends downward from a second edge of the second tray deck toward the first tray deck immediately below, there being a second gap between a second bottom edge of the second curved downcomer wall and the first tray deck, that extends substantially along the length of the second curved downcomer wall;

a first outlet weir is situated upon the first tray deck at a position adjacent to the first edge of the first tray deck; and a second outlet weir is situated upon the second tray deck at a position adjacent to the second edge of the second tray deck;

the first edge of the first tray deck, the first bottom edge of the first curved downcomer wall, the second edge of the second tray deck and the second bottom edge of the second curved downcomer wall are each curved with substantially the same curvature, so that the first edge of the first tray deck, the first bottom edge of the first curved downcomer wall and the second edge of the second tray deck are curved, with substantially the same curvature, the curvature of each curved component being:

formed in a plane defined mainly by the tray deck of the respective tray deck level; and selected from a group consisting of: a smooth arc, a curve achieved by a sequence of short linear adjoining sections at graduated angles relative to each other, and a combination of smooth arcs and short linear sections;

so that any part of liquid flowing across any portion of a first tray deck travels a similar distance to any other part of said liquid, and any part of liquid flowing across any portion of a second tray deck travels a similar distance to any other part of said liquid, thus providing uniform liquid distribution, minimizing back-mixing, and providing approximately even froth height at the first edge of the first tray deck and approximately even froth height at the second edge of the second tray deck.

8. A tray assembly according to claim 1, wherein the first downcomer is bounded by one of:

a combination of, on one side the inner surface of the walls of the chemical process tower, and on the other side a first curved downcomer wall; and a combination of two first curved downcomer walls.

9. A tray assembly according to claim 1, wherein the second downcomer is bounded by one of:

a combination of, on one side the inner surface of the walls of the chemical process tower, and on the other side a second curved downcomer wall; and a combination of two second curved downcomer walls.

* * * * *